W. E. PORTER.
CENTER FRICTION FOR CLOCKS AND WATCHES.
APPLICATION FILED OCT. 27, 1913.
1,241,148.
Patented Sept. 25, 1917.
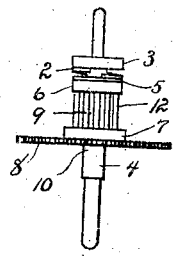
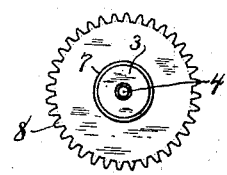
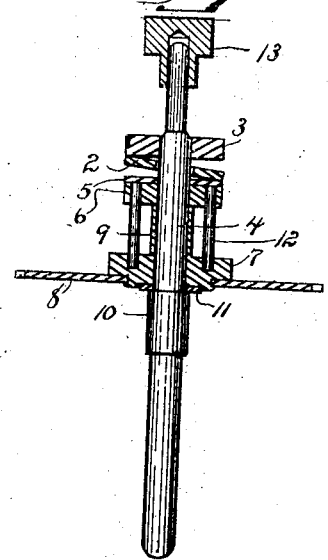
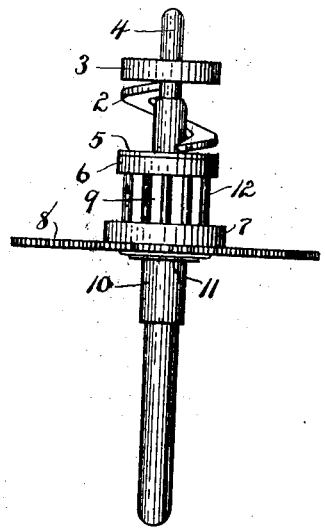
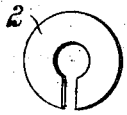

UNITED STATES PATENT OFFICE.

WILSON E. PORTER, OF NEW HAVEN, CONNECTICUT, ASSIGNOR TO NEW HAVEN CLOCK CO., OF NEW HAVEN, CONNECTICUT, A CORPORATION.

CENTER-FRICTION FOR CLOCKS AND WATCHES.

1,241,148. Specification of Letters Patent. Patented Sept. 25, 1917.

Application filed October 27, 1913. Serial No. 797,541.

*To all whom it may concern:*

Be it known that I, WILSON E. PORTER, a citizen of the United States, residing at New Haven, in the county of New Haven and State of Connecticut, have invented a new and useful Improvement in Center-Frictions for Clocks and Watches; and I do hereby declare the following, when taken in connection with the accompanying drawings and the characters of reference marked thereon, to be a full, clear, and exact description of the same, and which said drawings constitute part of this application, and represent, in—

Figure 1 a plan view of a center pinion for marine clocks and watches, provided with my improved friction device.

Fig. 2 a view thereof in front elevation.

Fig. 3 an enlarged view thereof in central longitudinal section with the exception of the center-arbor which is shown in plan.

Fig. 4 a plan view on the scale of Fig. 3, showing the parts assembled preparatory to placing the friction washer under compression.

Fig. 5 a detached perspective view of my improved slotted washer having a keyhole slot, shown as compressed.

My invention relates to an improvement in "center frictions", so called, primarily designed for use in marine clocks and watches, the object being to produce at a low cost for manufacture, a center friction constructed with particular reference to ease of assemblance and adjustment.

With these ends in view, my invention consists in a center friction for marine clocks and watches, having certain details of construction and combinations of parts as will be hereinafter described and pointed out in the claims.

In carrying out my invention as herein shown, I employ a friction washer 2 preferably made from a high grade of phosphor bronze and consisting of a disk having a keyhole slot the round portion of which is concentric with the periphery of the washer and the straight portion of which extends radially outward therefrom. The washer as thus constructed, is not a split washer, but a slotted washer, and is produced by removing a portion of its metal. The cut edges of the metal forming the walls of the slot and the ends of the washer are upset in opposite directions from the plane thereof.

By slotting the washer I avoid the contingency of the sticking of the said ends of the washer together in case the washer should be sufficiently compressed to reëngage them more or less. By slotting the washer instead of splitting it, the production of burs upon the opposing cut edges or ends is reduced to the minimum. Such slight bur as is produced, is readily removed, so as to leave the said ends smooth. This friction washer is interposed between an adjusting collar 3 located upon the inner end of the center arbor 4, and a cold, rolled steel bearing washer 5 placed against the rear face of the inner head or collar 6 of a lantern pinion the forward head or collar 7 of which has the center wheel 8 staked upon it. The heads or collars 6 and 7 are made integral with a fixed sleeve 9 turning loosely upon the center-arbor 4 at a point thereon to the rear of its integral spacing shoulder 10 the inner end of which is separated by a steel washer 11 from the forward face of the head or collar 7. The said heads or collars 6 and 7 are perforated in the usual manner for the reception of the short lengths of wire or "needles" 12 which form the leaves of the pinion which, as shown, is of the lantern type, though a cut-leaf pinion may be equally well employed in connection with my invention. After the parts have been assembled as shown in Fig. 4, they are placed in a foot press and the adjusting collar 3 is set down to its fixed position upon the arbor 4, whereby the friction washer 2 is compressed after which it exerts a constant effort to push the pinion forward on the arbor 4 with the effect of creating sufficient friction between the forward head or collar 7 of the pinion and the washer 11 to normally bind the said pinion, and hence the wheel 8, upon the arbor 4, so as to insure their rotation together. However, for setting the hands, the arbor may be turned either by the hands which are mounted upon its forward end or by a finger button 13 applied to its rear end without turning the pinion or wheel within which the arbor then rotates against the friction produced by the thrust of the washer 2.

I am aware that a considerable variety of friction washers have heretofore been used for supplying the friction which, in my device, is supplied by the radially slotted washer 2, but all friction devices heretofore employed, so far as I am aware, have been objectionable on account of the time and labor required to set them to produce just the amount of friction required. Thus cupped washers, which have been extensively used, must be individually adjusted as to friction after having been set in a foot press. Spiral spring frictions have been found vexatious and objectionable for the reason that their ends dig into the surfaces with which they are engaged so that when the center arbor is turned to set the hands, the springs will be slightly wound or unwound. Then when they recover and return to their normal condition, they will automatically rotate the center arbor enough to move the hands in one direction or the other, and so spoil the time. This objection may, to some extent, be obviated by carefully flattening and polishing the ends of the spring but the expense of so doing is prohibitive. Spiral springs are also objectionable because they take more longitudinal space than metal washers. The advantage of my slotted washer is that it is compact, never of itself effects the rotation of the center arbor in either direction and may be properly set in a foot press without any subsequent adjustment or expenditure of time. In explanation of this last statement, it should be explained that the friction developed by my slotted washer is substantially the same throughout the entire range of its compression, beginning with its initial compression up to its complete compression. There will, of course, be a small gradual increase of frictional power developed between initial and final compression, but there is always sufficient compression for the friction required, at any point between initial and final compression. It follows from this that all of the factors of variation in the size and thickness of the parts, and in the action of the foot-press may be disregarded since the washer acts, in a sense, as a medium of universal compensation for all of these variations so that it becomes unnecessary to examine each center after it leaves the foot press and complete the process of compression manually for each individual center as has heretofore been required in prior practice. In a factory turning out a large number of clocks or watches per day, the saving of time by eliminating the necessity of adjusting the tension of the center frictions makes a considerable saving of expense.

I claim:—

1. A center friction for clocks and watches, characterized by the employment of a sheet-metal friction washer having a key-hole slot the round portion of which is concentric with the periphery of the washer and the straight portion of which extends radially outward from the said round portion and the ends forming the side walls of the slotted portion of the washer being offset in opposite directions from the plane of the washer, the said washer being loosely mounted upon the center arbor of the clock-movement and interposed between an adjusting-washer frictionally driven upon the said arbor and a bearing-washer engaged with one end of a pinion loosely mounted upon the said arbor and carrying the center wheel of the movement, and the said washer being compressed by setting the adjusting-washer upon the center arbor and exerting a constant effort to hold the said pinion and wheel against rotation thereupon, whereby the holding effect of the friction washer is obtained irrespective of the amount to which it is compressed short of compression to its initial flatness.

2. A center-friction for clocks and watches, characterized by the employment of a sheet-metal friction washer having a key-hole slot wide enough to prevent the ends of the slot from coming into contact when the washer is compressed to substantial flatness, the said washer having its ends offset in opposite directions from its plane and being loosely mounted upon the center arbor of a clock-movement and interposed between an adjusting-collar mounted upon the said arbor and a pinion loosely mounted upon the said arbor, and the said washer being compressed by setting the adjusting collar upon the arbor and when so compressed, exerting a constant effort to hold the said pinion against rotation thereupon.

In testimony whereof, I have signed this specification in the presence of two subscribing witnesses.

WILSON E. PORTER.

Witnesses:
FREDERIC C. EARLE,
MALCOLM P. NICHOLS.

Copies of this patent may be obtained for five cents each, by addressing the "Commissioner of Patents, Washington, D. C."